United States Patent [19]

Oh et al.

[11] 4,451,122
[45] May 29, 1984

[54] MULTICOMPARTMENT ELECTRO-OPTIC DISPLAY DEVICE

[75] Inventors: Chan S. Oh, Diamond Bar; Gordon Kramer, Huntington Beach, both of Calif.

[73] Assignee: Beckman Instruments, Inc., Fullerton, Calif.

[21] Appl. No.: 256,337

[22] Filed: Apr. 22, 1981

Related U.S. Application Data

[63] Continuation-in-part of Ser. No. 220,653, Dec. 29, 1980, abandoned.

[51] Int. Cl.$^3$ .............................................. G02F 1/133
[52] U.S. Cl. ...................................... 350/334; 350/343
[58] Field of Search ................. 350/336, 343, 339 R, 350/349, 335, 357, 356, 331 T, 330, 350 F, 347 R, 347 E, 349, 338, 333, 334, 331 R, 344, 397, 398; 156/654, 904; 428/1; 340/785

[56] References Cited

U.S. PATENT DOCUMENTS

| | | | |
|---|---|---|---|
| 3,820,875 | 6/1980 | Bohmer | 350/336 X |
| 3,833,287 | 9/1974 | Taylor et al. | 350/160 |
| 3,840,695 | 10/1974 | Fischer | 350/339 F X |
| 3,862,360 | 1/1975 | Dill et al. | 350/334 X |
| 3,864,589 | 2/1975 | Schoot et al. | 340/785 X |
| 3,978,580 | 9/1976 | Leupp et al. | 350/344 X |
| 4,023,890 | 5/1977 | Shirasu et al. | 350/160 |
| 4,029,393 | 6/1977 | Dungan et al. | 350/331 T X |
| 4,050,786 | 9/1977 | Feldman | 350/160 |
| 4,054,368 | 10/1977 | Krueger et al. | 350/349 |
| 4,074,008 | 2/1978 | Green | 156/904 X |
| 4,091,375 | 5/1978 | Robillard | 350/333 X |
| 4,093,355 | 6/1975 | Kaplit et al. | 350/334 |
| 4,093,356 | 6/1978 | Bigelow | 350/338 |
| 4,104,627 | 8/1978 | Thuler | 340/336 |
| 4,128,313 | 12/1978 | Cole, Jr. et al. | 350/340 |
| 4,176,918 | 12/1979 | Labes | 350/350 F X |
| 4,235,526 | 11/1980 | Berman et al. | 352/349 X |
| 4,241,344 | 12/1980 | Kmetz et al. | 350/336 X |
| 4,335,936 | 6/1982 | Nonomura et al. | 350/336 X |

FOREIGN PATENT DOCUMENTS

| | | | |
|---|---|---|---|
| 55-43507 | 11/1978 | Japan | 350/349 |
| 55-128833 | 10/1980 | Japan | 156/904 |
| 1390925 | 4/1975 | United Kingdom | 350/335 |

OTHER PUBLICATIONS

"Guest-Host Interactions in Nematic Liquid Crystals. A New Electro-Optic Effect," by G. H. Heilmeier et al., Applied Physics Letters, vol. 13, No. 3, Aug. 1, 1968, pp. 91-92.

"Guest-Host Interactions in Nematic Liquid Crystals," by G. H. Heilmeier et al., Molecular Crystals and Liquid Crystals, 1969, vol. 8, pp. 293-304.

"New Absorptive Mode Reflective Liquid-Crystal Display Device," by Donald L. White et al., Journal of Applied Physics, vol. 45, No. 11, Nov. 1974, pp. 4718-4723.

"Orientation of Liquid Crystals by Surface Coupling Agents," by Frederic J. Kahn, Applied Physics Letter, vol. 22, No. 8, Apr. 15, 1973, pp. 386-388.

Herbaugh et al., "Screenable Plating Mask Material Formulation", *IBM Technical Disclosure*, vol. 15, No. 1, Jun. 1975, p. 50.

Nikada et al., "Liquid Crystal Display", *Proceeding of S.I.D.*, vol. 16/3, Third Quarter 1975, pp. 144-148.

Wild et al., "Liquid Crystal Bar Graph Display", *IEEE Conference on Displays*, No. 8, Sep. 7-10, 1971, pp. 161-165.

Ueno et al., "Reflective and Positive Mode Color LCD Using Cholesteric-Nematic Phase Change Type Guest Host Effect", *SID79 Digest*, May 10, 1979, Japan.

Tsukamoto et al., Liquid Crystal Matrix Display Device with a New Panel Structure, Jap. J. Appl. Phys., vol. 13, No. 10, (1974), pp. 1665-1666.

Nakada et al., "A Design of Multiplexing Liquid Crystal Display for Calculators", Proceedings of the SID, vol. 16/3, Third Quarter 1975, pp. 144-148.

Herbaugh et al., "Screenable Plating Mask Material Formulation", IBM Technical Disclosure Bulletin, vol. 15, No. 1, Jun. 1972, p. 50.

*Primary Examiner*—John K. Corbin
*Assistant Examiner*—David Lewis
*Attorney, Agent, or Firm*—R. J. Steinmeyer; F. L. Mehlhoff; W. H. May

[57] ABSTRACT

An electro-optic display device having at least two separate compartments for receipt of electro-sensitive material that is utilized in the formation or establishment of a display symbol as a result of an electrically imposed field. One compartment in the display contains the electrodes which form the various segments of the variable symbol to be displayed. The other compartment is the background area that will contrast visually with the segment portions that make up or establish the symbol to be displayed. The choice of material makes the background compartment optically equivalent to the portion of the symbol compartment that is not displaying a particular symbol. The electro-optic device preferably has a liquid crystal material with a dye to create a light absorption type of electro-optic display rather than a light modulation type of display. This invention allows dye displays that normally portray light characters on a dark background to be portrayed as dark characters on a light background.

In a second embodiment of the invention one compartment contains a liquid crystal material with a particular set of electro-optical characteristics and additional compartments contain different materials with different sets of electro-optical characteristics. Each compartment is used for information display. This invention allows a higher density of information to be presented on a single display device by allowing higher levels of multiplexing to be employed.

14 Claims, 10 Drawing Figures

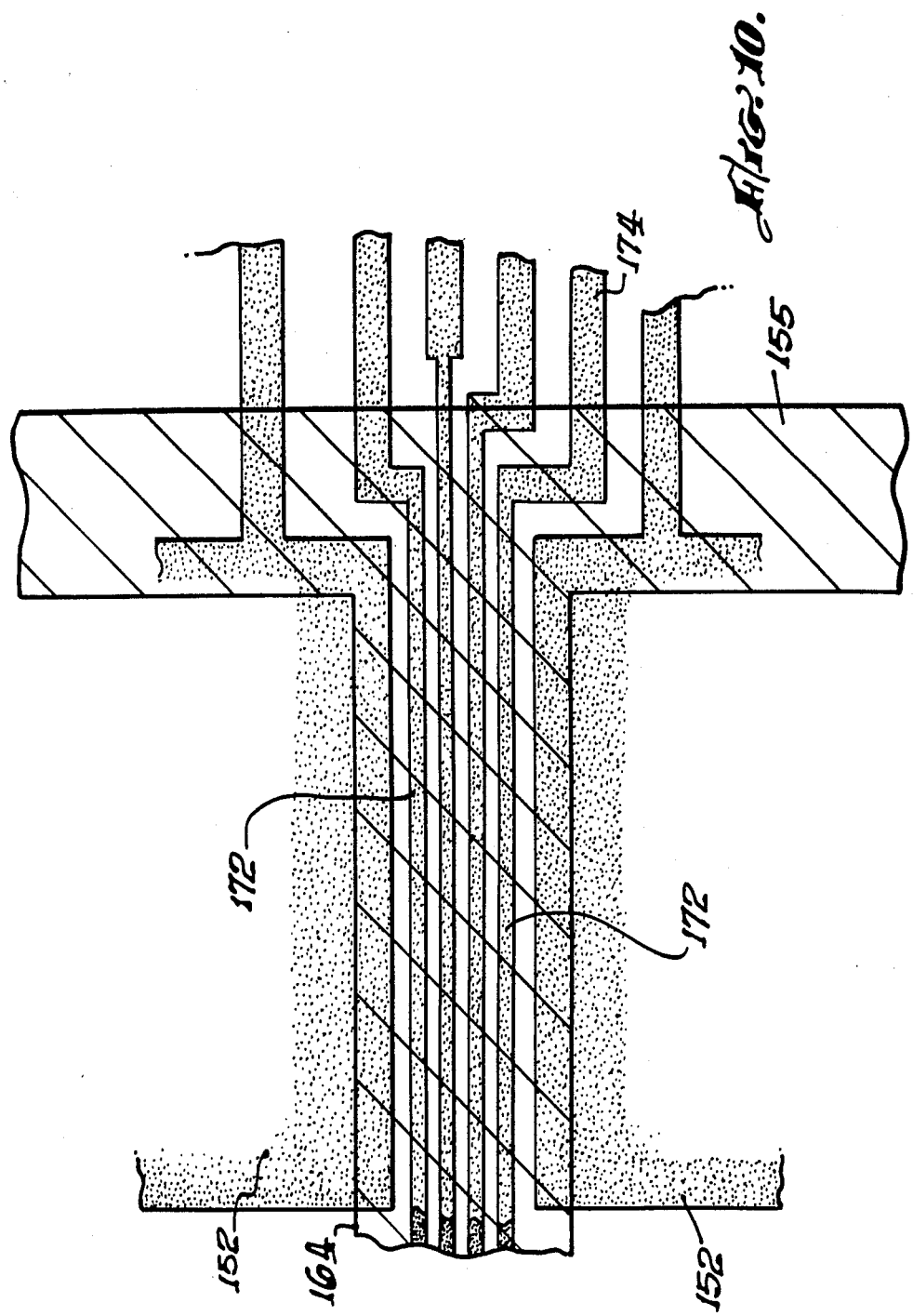

MULTICOMPARTMENT ELECTRO-OPTIC DISPLAY DEVICE

RELATED APPLICATION

This application is a continuation-in-part of application Ser. No. 220,653, now abandonned filed Dec. 29, 1980.

BACKGROUND OF THE INVENTION

The present invention is directed to electro-optic display devices and, more particularly, is directed to a multi-compartment liquid crystal dye display and a multi-compartment high level multiplexed display.

It has been well known for many years to construct passive display devices, light valves or modulators by enclosing a liquid crystalline material between two transparent electrodes and applying an electrical field between the opposing electrodes. A variety of patterns and symbols of numeric or alphanumeric characters have been displayed by the many varieties or choices of intricate designs utilized in the overlapping areas of the opposing electrodes. A very common use of liquid crystal displays has been in the electrical field sensitive mode, twisted nematic mode, and the cholesteric to nematic phase transition mode using positive dielectric anisotropic liquid crystal materials. However, it is necessary to utilize one or more polarizers to visualize or see the electro-optic changes which occur in the material. Essentially these displays, using a twisted nematic type of material operate in a light modulation mode wherein the contrast obtained in the display is created by how the light is allowed to flow into and out of the display.

It has also been found that it is possible to dissolve anisotropic dyes in the field sensitive liquid crystal compositions. When this field sensitive liquid crystal material is switched or operated by an electric field, the dye molecules will align or follow the liquid crystal molecules and, consequently, their absorption axis will align with the molecule axis of the liquid crystal material. The use of polarizers is not necessary when dye molecules are utilized in a liquid crystal material, since the display then is operating as a light absorption type of display rather than a light modulation type of display. The contrast is established in the display as the result of the differences of light absorption in the various portions of the display.

Typically, when these electro-optic displays have been constructed using the dye molecules in the liquid crystal material, the glass substrates containing the electrode patterns are bonded by a suitable bonding agent. Usually the bonding area is at the extreme or perimeter of the device and, therefore, is out of the sight of the viewer when the display is constructed and assembled. The entire display area contains the electro-optic medium of the display device.

To provide additional background information with respect to the operation of the liquid crystal display using dichroic or pleochroic dyes, it should be noted that upon the imposition of an electric field across the opposing electrodes in the display device, the liquid crystal material, as well as the dissolved dye molecules, will orient along the electric field. If the liquid crystal material has a positive dielectric anisotropy, the orientation is essentially perpendicular to the display surface. The long molecular axis of the dye will also orient generally perpendicular to the display surface, since the molecular axis of the dye positions are generally parallel to the liquid crystal's molecular long axis. Most of the commonly available dichroic dyes have strong absorption when the electric vector of the light is parallel to their transition moment which is usually parallel to their long molecular axis. Hence, the energized area between the overlapping electrodes within the display will become the light or less absorbing area. The dark area of the non-energized or non-electrode portions can be made even darker by adding cholesteric dopants, which effectively induce a spontaneous helicoidal arrangement of the liquid crystal host along with the dissolved dye materials.

A general disadvantage to the above discussed type of dichroic dye liquid crystal displays is that the symbol is limited to being light colored against a dark colored background. In some instances it is more desirable to have the symbol dark colored against a light colored background. Another disadvantage is that the fully energized segment which is designed to provide a light area will still exhibit some residual color which may become darker when it is viewed from an angle substantially tilted from the normal of the display.

Some prior art approaches have been suggested for obtaining a positive dichroic dye liquid crystal display where the desired symbol is dark colored and the background is white or lighter colored. Reference is made to U.S. Pat. Nos. 4,235,525 and 4,235,526 which disclose a display where the dichroic dye liquid crystal is confined only to the segment area while all the interior areas of the symbol and the background area is occupied by a bonding agent. The bonding agent which fills all the background area can be tinted with some type of appropriate color to match the residual color of the energized segments. However, it is to be noted that the tinted color is the isotropic type, while the color of the energized segment is anisotropic. Consequently, the color intensity will vary, depending upon the azimuthal viewing angle. The perfect color matching of the residual colors in the energized area with that of the tinted bonding agent is impossible. The matching of the background material color with that of the symbol area is very desirable with respect to the commercial value of the display. The possible viewing of a ghost symbol may appear to the viewer when looking at the display. Depending upon the viewing angle, the ghost image may become even more significant because the color intensity of the background area may become greater as the viewing axis moves to some acute angle to the surface of the display.

SUMMARY OF THE INVENTION

The present invention is directed to a display device having at least two separate compartments which are designed to receive an electro-optic medium, so that essentially perfect color matching is possible between the background area of the display and the unshown segments of the character portion of the display. Consequently, there will be no viewing of a ghost character with respect to the segments that are not intended to be visible in contrast view with respect to the background area of the display. In other words, the only contrast which will be visible in the display will be that contrast between the portion of the character which is designed to be shown and recognized by the viewer and the background. There will be no intermediate color or shading that would possibly result in a faint or somewhat slightly discernible symbol that is slightly contrasted in a different color than that of the overall background area.

The outline of the character or symbol areas is defined by a thin bonding agent which forms a very thin border seal. Another seal is made around the extreme periphery of the display. Consequently, two compartments are formed within the display. The first compartment surrounds the symbol or character areas of the display while the second compartment constitutes the background area between the symbol areas and the periphery seal.

In the present invention the preferable type of material utilized is a cholesteric liquid crystal dichroic dye material in the character area compartment while the same type of liquid crystal material, but in the form of a nematic liquid crystal dichroic dye material, is placed within the background area compartment. Therefore, when any portion of the character compartment is energized by an electrical field, the cholesteric liquid crystal will unwind from its helicoidal orientation and will become a nematic liquid crystal dichroic dye material. Since the material in the symbol area is the same as the background material, when the symbol area material is energized and becomes a nematic liquid crystal dichroic dye material, the two areas will blend and be optically equivalent, because the energized areas in the character compartment and the background area compartment will both be in the nematic state.

The invention also incorporates the use of very thin seal lines that can be projected into the display viewing are a without being noticeable to the observer when viewing the display from its normal intended viewing distance. These seal lines provide a means for masking the connector lead lines that run from the display electrodes to the edge of the display. Consequently, only a single continuous opposing electrode is required to operate in conjunction with the display electrodes.

A second embodiment of this invention is directed to a multi-compartment display containing liquid crystal materials of different threshold voltages. Since the ability to multiplex liquid crystal materials depends strongly on the ratio of the voltage levels required to turn the display on and off, this feature will allow greater flexibility and latitude in the design of electronic driving systems and increase the number of lines that can be multiplexed.

BRIEF DESCRIPTION OF THE DRAWINGS

FIG. 10 is an enlarged schematic of a portion of the display in FIG. 9 showing the masking function of the seal lines over the narrow electrode lead line.

DETAILED DESCRIPTION OF THE INVENTION

Figure 1:
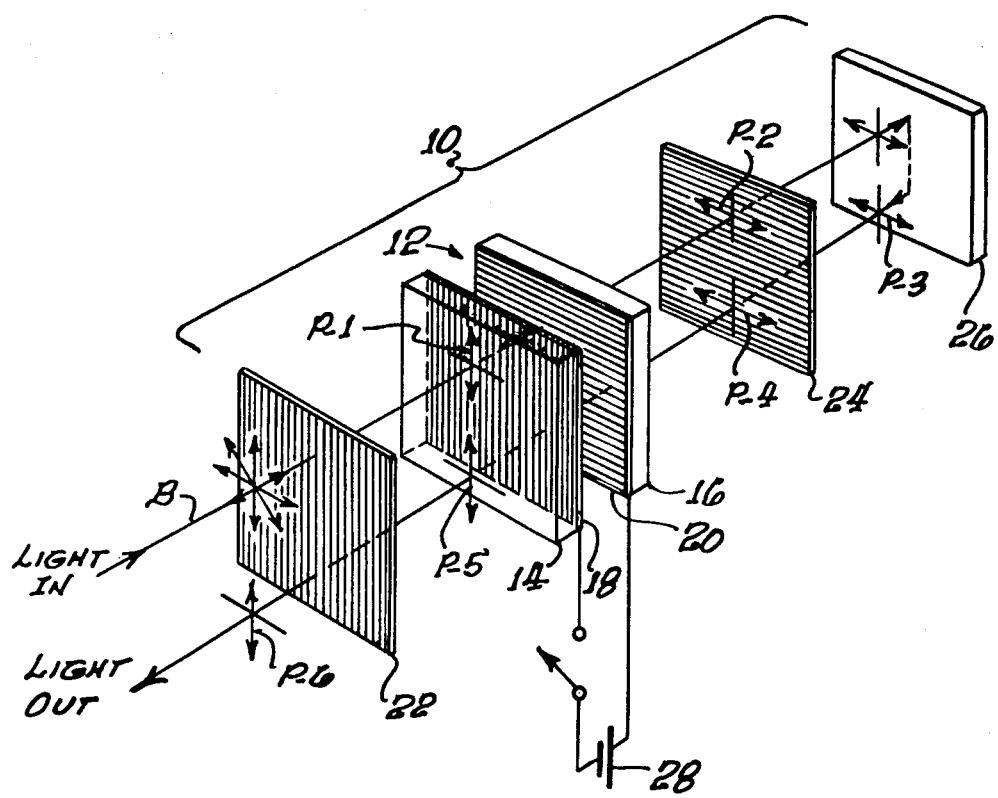
FIG. 1 is an exploded schematic view of a prior art LC display.

FIG. 1 illustrates a conventional prior art field effect (twisted nematic) liquid crystal display 10 and is designed to present a relatively black image on a clear or gray background. The display 10 has an LC cell 12 comprising a front plate 14 and a back plate 16 with respective transparent conductors 18 and 20 on each and a spacer seal (not shown) between. A liquid crystal film is disposed in the LC cell 12 between the facing conductors 18 and 20. The display 10 has a front polarizer 22 adjacent the front plate 14 and a back polarizer 24 and reflector 26 adjacent the back plate 16. A special treatment of the conductor surfaces is provided to induce the proper conventional twisted 90° orientation of the liquid crystal material.

The display 10 will be in the quiescent (non-active, light-transmitting) state when field intensity is kept below the active switching voltage level to establish the display-ON condition with illumination being passed. When sufficient field or switching voltage is impressed on cell 12, the 90° twisted orientation of cell molecules indicated in FIG. 1 will be suppressed as known in the art, so that a passing light beam will not be rotated 90° and cannot pass rear polarizer 24, but will be absorbed or blocked by it. This light-blocking condition corresponds to Field-ON state. However, with proper modification or orientation of the polarizers the reverse or light-transmitting state may also be rendered with Field-ON state.

In the operation of display 10 the front polarizer 22 passes only vertically polarized light (note beam B and light vector P-1), and directs it to the liquid crystal cell 12. After traversing the cell, the light is twisted 90° in polarization from the vertical molecular alignment along the first electrode 18 to the horizontal alignment of the second opposing electrode 20 (see vector P-2). The light exiting from cell 12 is thus horizontally polarized and passes next through a rear polarizer 24 as a horizontally polarized light wave. This light is reflected by the reflector 22 and retraverses the system being rotated 90° again through the cell 12 (vector P-5) to emerge as a display image issuing from the front polarizer 22 (vector P-6). The rear polarizer 20 is crossed with front polarizer 18.

Application of sufficient switching voltage 28 to the electrodes 18 and 20 impresses a field between them sufficient to block transmitted light and switch the display OFF. This will act to disturb the helical orientation of the liquid crystal molecules in such a way that the molecules will follow the field lines normal to the cell walls, so that no 90° rotation of polarization occurs. The light transmission is impeded by blockage at the rear polarizer 20 and no display image issues from front polarizer 18.

Turning attention to the present invention, one should note that a guest host liquid crystal material is used in a multi-compartment display. The liquid crystal material is a host material that receives a dichroic or pleochroic dye which is dissolved in the liquid crystal composition. The dye molecules will then cooperatively react with the liquid crystal molecules and, consequently, change their absorption axis to vary the amount of absorption of light within the dye material. Consequently, the display acts as a light absorption display to create the contrast rather than a light modulation approach for contrast in the display as in the case of twisted nematic display. No requirement exists for the utilization of polarizers (such as polarizers 22 and 24 in FIG. 1) in a dichroic or pleochroic dye display. This is because there is no need to specifically orient the light prior to its entry into the display material.

Figure 2:
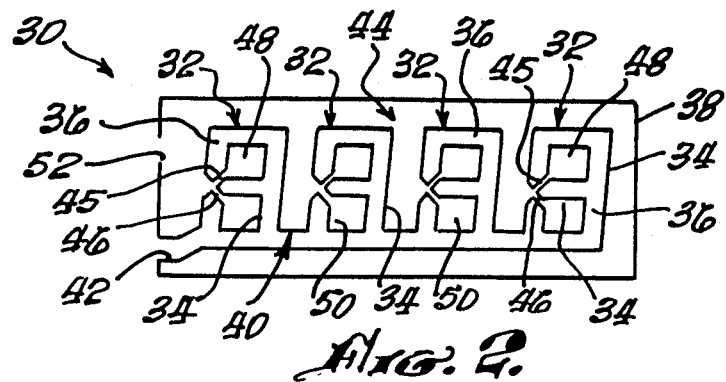
FIG. 2 shows a planar view of the design of the thin seals to form two compartments in a four digit numeric display.

Reference is made to FIG. 2 showing a compartmentized display arrangement 30 having four character or digit positions 32. The outlines shown in FIG. 2 forming the digit positions 32 represent very thin lines or ridges 34 of a bonding agent to form a thin wall around the symbol or segment areas 36 of the display. Also located around the periphery of the display is a perimeter seal or wall which is a thin line or ridge 38 of bonding material. The symbol area ridges 34 and the perimeter ridge 38 form two compartments 40 and 44 in the display. This arrangement would be placed on the interior of either the front plate 14 or rear plate 16 or both with reference to FIG. 1. The first compartment 40 has an entry port 42 and represents essentially the entire character or symbol area of each of the digit positions 32. The second compartment or area 44 of the display is defined by the perimeter seal line 38 and the symbol area lines 34 of the separate digit positions 32 and represents the background of the display. Also, located in each of the digit positions 32 are a pair of connecting channels 45 and 46 that provide communication between the compartment 40 and the interior upper area 48 and the interior lower area 50 of each of the digit positions 32. The background area compartment 44 has an entry port 52.

As can be seen with respect to FIGS. 1 and 2 in the above description, when the front plate 14 is sealed with back plate 16 and has the compartmentized arrangement 30, a liquid crystal material or any other electro-optical medium can be introduced into entry port 52 and will fill the background compartment 44. Because of the connecting channels 45 and 46 in each of the digit positions 32, the material flowing into the background compartment 44 will also enter into the interior upper area 48 and lower area 50 of each digit position 32. Similarly, a liquid crystal medium or any other electro-optical medium can be introduced through entry port 42 into the compartment 40 which represents the character or digit segment areas of the display.

Figure 3:
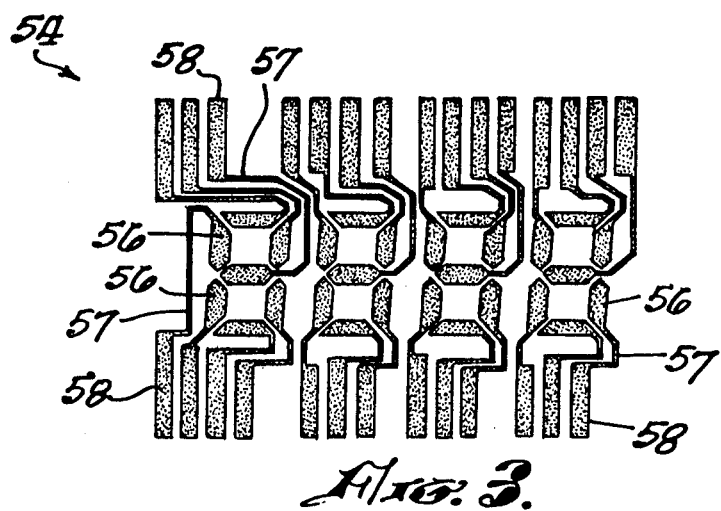
FIG. 3 is a layout of the electrode pattern utilized in conjunction with the design of FIG. 2.

FIG. 3 shows the electrode pattern 54 which corresponds to the segment areas 36 of the digit positions 32 in FIG. 2. Each of the electrode segments 56 has a lead line 57 and a terminal pad 58. By activating the appropriate segments 56 in the electrode pattern 54, the desired symbol will appear in the display as will be explained in more detail below.

In the preferred embodiment of the present invention the compartment 40 in FIG. 2 is filled with a cholesteric liquid crystal dichroic dye material while the compartment 44 is filled with a similar liquid crystal dichroic dye material that is nematic without the cholesteric component.

The electrode pattern 54 of FIG. 3 is typically placed on the larger plate of the display while the other plate carries an opposing electrode of a continuous film of an electric conductor. There is no requirement that the opposing electrode have a particular electrode pattern. Since there are no opposing pattern electrodes on the substrate in the background compartment area 44 of the display, the nematic liquid crystal dichroic dye material will be in the quiescent stage and have a specific residual color depending upon the absorption characteristics of the dye material in a liquid crystal composition. The cholesteric liquid crystal dichroic dye material will appear darker in compartment 40 than the nematic material in the compartment 44. This is because the cholesteric liquid crystal material is turned and there is more light absorption of the dye material. However, when a particular electrode segment 56 of the corresponding digit area 36 is activated, that particular portion of the digit area will result in the alignment of the liquid crystal molecules in a nematic phase and, therefore, will assume the identical residual color and angular viewing characteristics as the background nematic material in compartment 44. Consequently, the energized segment will blend identically into the background nematic liquid crystal material of compartment 44.

In operation of the display, if certain symbols in the digit areas 36 are to be displayed, the remainder of the digit area must be turned on so that this latter area takes on the characteristics of a nematic liquid crystal and blends into the same nematic liquid crystal material as in background compartment 44. Consequently, the application of the electrical field between the electrode segments corresponding to the digit area not to be viewed and the opposing electrode will cause the cholesteric material to become optically equivalent to the nematic liquid crystal material in the background compartment 44. Regardless of the azimuthal viewing angle of the observer, the areas which have been turned on in the digit areas 36 will have the same color characteristics as the background material in the compartment 44.

It is also assumed that the thin bonding material lines 34 and 38 used to form the barriers to establish the respective compartments 40 and 44 can be colored or dyed a compatible color with the material that is in the background compartment 44, so that they are not discernible when viewing the display at its intended distance of use.

Since the opposing electrode on one of the plates in the display arrangement shown in FIGS. 2 and 3 is one continuous electrode, it is possible to make the electrode of a reflective material so that it will act as an internal reflector in the display. This will improve the viewing characteristics by helping to reduce parallax effects and the shadowing or double imaging characteristics that are seen in some displays when viewed at an angle. Also, it is possible to use the opposing electrode as an internal heater by adjusting its electrical resistance. Since the opposing electrode acts as a mirror and does not have to be transparent, its electrical resistance can be varied to optimize its performance as a heater.

Figure 4:
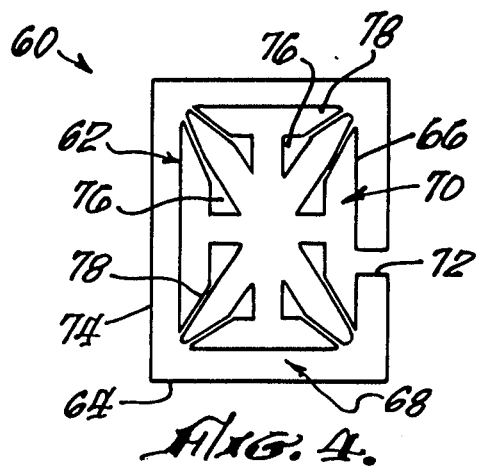
FIG. 4 is a planar view of the design of the thin seals to form a dual compartment for an alphanumeric character.

Reference is made to FIG. 4 showing an alphanumeric display 60 having an alphanumeric digit 62. Surrounding the periphery of the display is a thin ridge seal 64 of bonding agent while surrounding the exterior of the alphanumeric digit 62 as a thin ridge seal 66. The perimeter seal 64 in conjunction with the digit seal 66 establishes a background compartment 68. The outline seal 66 of the alphanumeric symbol 62 establishes a second compartment 70 and is in communication with a fill port 72. Similarly, the background compartment 68 is in communication with a fill port 74. The interior islands 76 of the digit 62 are interconnected by the connecting channels 78 to the background compartment or chamber 68 of the display.

As with the display 30 shown in FIG. 2, when the plates of the display are sealed together, the background chamber 68 can be filled through fill port 74 with a nematic liquid crystal dichroic dye material and the material will flow through the interconnect channels 78 to each of the interior areas 76 of the alphanumeric digit 62. Similarly, through the fill port 72, a cholesteric nematic liquid crystal dichroic dye material can be inserted to fill the chamber 70 which represents the alphanumeric symbol portion of the display.

Figure 5:
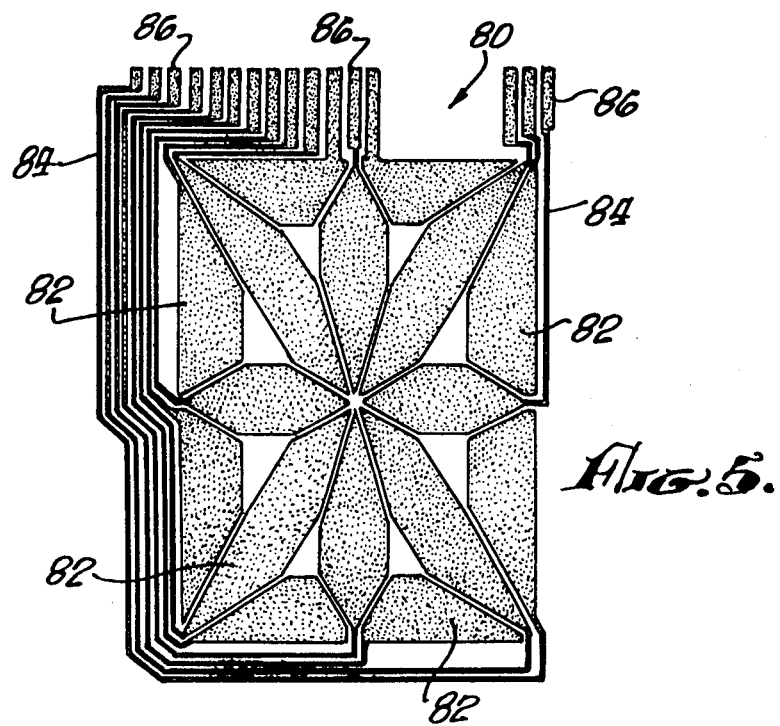
FIG. 5 is the electrode pattern utilized in conjunction with the design set forth in FIG. 4.

As shown in FIG. 5, the alphanumeric symbol 62 has a corresponding electrode pattern 80. Each of the electrode segments 82 has a lead line 84 and a terminal pad 86. The various segments 82 can be individually and separately operated to form various visual alphanumeric symbols. In the operation of the display, the nematic liquid crystal material in the background compartment 68 will be optically equivalent with the energized segments 82 in the alphanumeric compartment 70 in FIG. 4, so that the only visible contrast will be between the portions of the alphanumeric compartment 70 which are to be viewed in contrast with the overall background nematic liquid crystal material. The activation of any segment within the alphanumeric compartment 70 will result in the cholesteric material acquiring the characteristics of a nematic liquid crystal material to establish the color match with the crystal material in the background compartment 68.

Figures 6, 7:
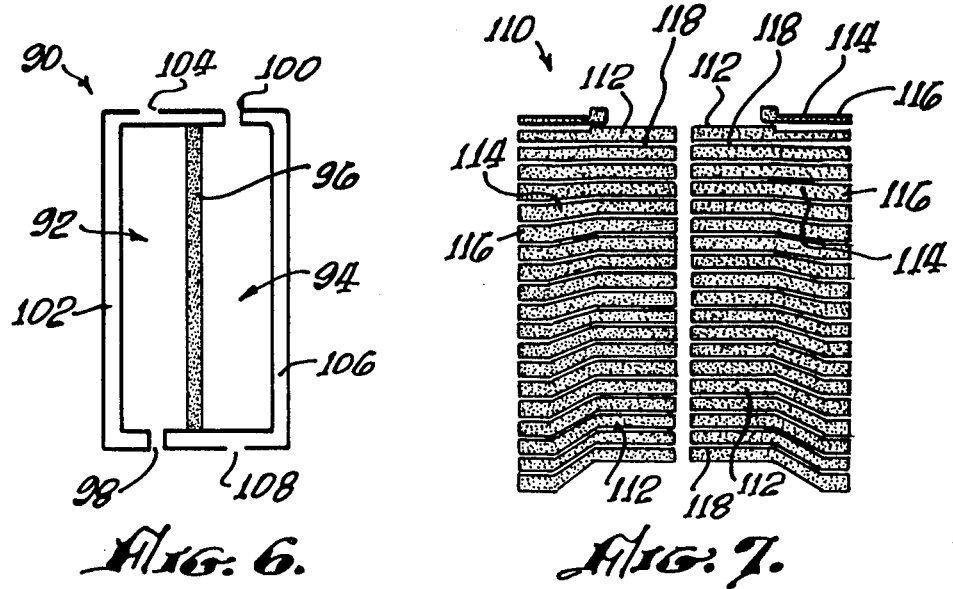
FIG. 6 illustrates a thin seal design to form a dual bar graph with four separate compartments.
FIG. 7 is an electrode pattern for use in the dual bar graph layout of FIG. 6.

Reference is made to FIG. 6 showing a thin ridge seal arrangement for use in forming a display device 90 having a dual bar graph capability. In this particular arrangement two main interior cavities 92 and 94 are established and are divided by a barrier seal 96. The one main compartment 92 has a fill port 98 while the other main compartment 94 has a fill port 100. Located adjacent the compartment 92 is a background compartment 102 which has a fill port 104. Similarly, the compartment 94 has a background compartment 106 with a fill port 108. Therefore, the thin ridge seal arrangement establishes a display 90 with four compartments or chambers to provide the dual bar graph capability. FIG. 7 shows the electrode pattern 110 for utilization in conjunction with the compartmentized arrangement of FIG. 6. Each of the electrode segments or bars 112 has a lead line 114 and a terminal pad 116.

Preferably, the compartment 92 and compartment 94 are filled with a cholesteric liquid crystal dichroic dye mixture while areas or compartments 102 and 106 are filled with a matching nematic dichroic dye mixture. It is envisioned that the energized areas of compartments 92 and 94 will be exactly color matched or optically matched with the respective adjacent compartments 102 and 106.

It should be noted that the energized segments 112 in FIG. 7 will have an internal gradation in the bar graph to aesthetically aid in the capability of determining the relative length of the bar. The non-electrode areas in compartments 92 and 94 that are represented by the spaces 118 between the respective electrode segments 112 as shown in FIG. 7 will be in the cholesteric liquid crystal dichroic dye state and cannot be energized. Consequently, there will remain some type of color or contrasting thin line between the bars which will appear in the operation of the display. Consequently, it is possible, depending upon how the electrode pattern is designed or made, to have appropriate built-in legends that can be created in the bar graph. This can be done by leaving certain designed portions of the display compartment without an electrode. Although a dual bar graph is shown, it is possible to show a multi-bar graph in one display using the concept of multi-compartments.

As with the bar graph and with any other type of display using the multi-compartment concept of the present invention, it is possible to generate multi-colored displays in one device. With the example of the bar graph, it is possible that the area 92 in FIG. 6 may be filled with a red colored cholesteric nematic liquid crystal and the area 102 can be filled with a matching red colored nematic material. On the other hand, the compartment 94 can be filled with a blue colored cholesteric dichroic dye material and the compartment 106 can be filled with a matching blue colored nematic material.

Although certain specific embodiments of the present invention have been discussed, it is envisioned that many variations from the basic concept of the present invention can be generated by those skilled in the art. One such example would be to use many colors to enhance the visual contrast by mixing a pair of positive and negative dichroic dyes which possess complementary absorption characteristics. Further, it may be possible to incorporate fluorescent and/or whitening dyes in these mixtures in these multi-compartments to enhance visual contrast of the displays. Similarly, it is envisioned that the multi-compartment concept will provide the ability to fill the compartments with liquid crystal materials that may have different operating and threshold voltages. This latter feature will enable display device designers to create high density multi-line liquid crystal displays. It is conceivable that such displays may have several hundred lines of discrete pixels.

Briefly, this can be accomplished by the utilization of a series of compartments which may be arranged, for example, vertically one next to the other wherein each has, for example, sixteen horizontal lines or electrodes. Opposing these horizontal electrodes would be vertical lines or electrodes that would intersect the horizontal lines at some orthogonal angle and the number of vertical lines could extend any distance one next to each other in the horizontal direction, depending upon how large a display would be desirable. In each of the compartments an electro-optical medium having different threshold voltages would be utilized, so that the whole display panel would operate in such a manner that the vertical electrode lines would be common to each of the compartments. Therefore, utilizing the proper electronic driving arrangement, one may operate each discrete pixel throughout the total display panel which is made up of the various separate compartments. Since liquid crystal multiplexing operates on the amplitude select principle, it would be necessary to select the desired threshold voltage electro-optic medium for each of the different compartments, so that a relatively large liquid crystal or electro-optical display panel can be constructed for multiplexing. Therefore, it would be possible to multiplex at a very high level of more than sixteen lines in a particular display panel. Further, it would be possible to provide a much higher density of information in a given area of the display.

Figure 8:
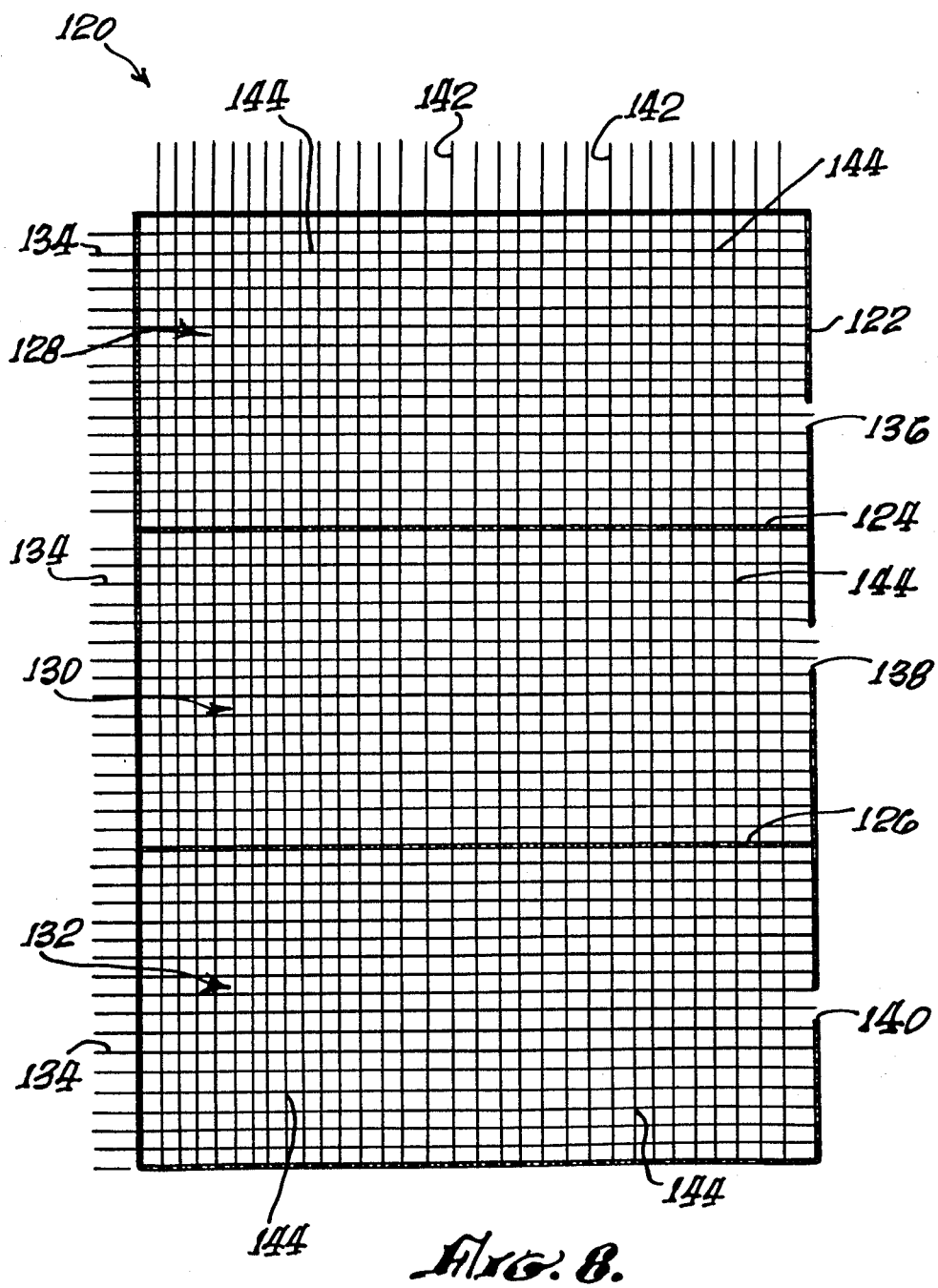
FIG. 8 is a schematic arrangement of a multi-compartment high level multiplexed display.

A schematic sketch of a high level multiplexed liquid crystal or electro-optical display panel 120 is shown in FIG. 8. Around the entire periphery of the display 120 is a perimeter seal 122 which is comprised of a bonding material used for sealing the opposing plates of the display together to form a large interior envelope. Located within the display are barrier seals 124 and 126 which divide the entire display 120 into three separate compartments 128, 130 and 132. By way of example, each of the compartments 128, 130 and 132 has sixteen electrode lines 134. Each of the compartments 128, 130 and 132 has respective fill ports 136, 138 and 140.

Common to all of the separate compartments 128, 130 and 132 are vertical electrode lines 142. The intersection between the horizontal electrode lines 134 and the vertical electrode lines 142 creates a plurality of pixels or discrete cross-over points 144. The length of the horizontal electrode lines 134 is not limited and can be made any length, depending upon the number of vertical electrode lines 142 desired for the size display wanted. Inserted into each of the compartments through their respective fill ports 136, 138 and 140 are electro-optical mediums having different threshold voltages. Therefore, when the display is operated, the addressing circuitry (not shown) will provide for the activation of the desired number of pixels from the various compartments in the format desired to create a message. By the use of the present invention having the multi-compartment concept, it is possible to create a multiplexed liquid crystal display covering a larger area with a greater density of information, depending upon how close the pixels are arranged.

Figure 9:
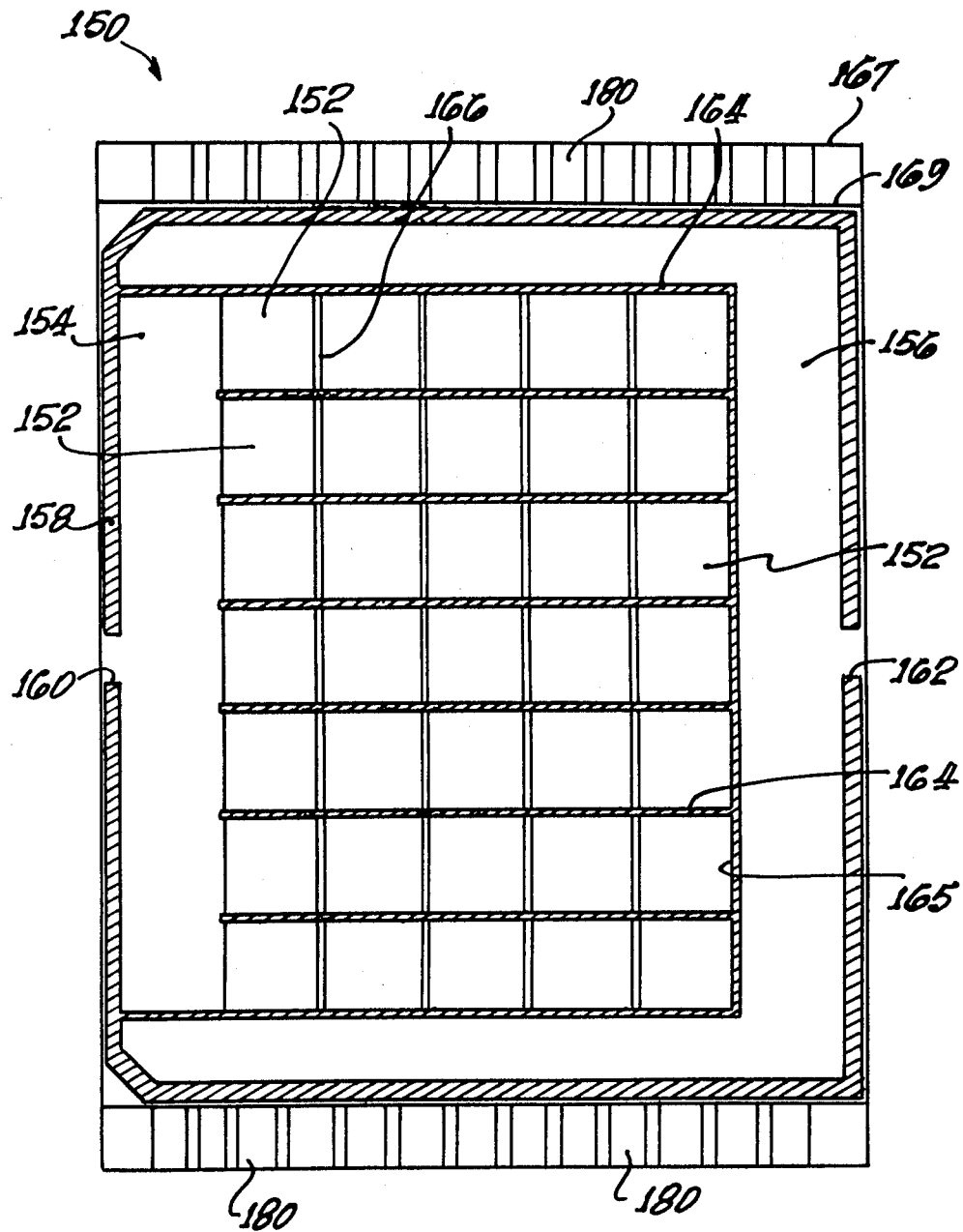
FIG. 9 is a planar view of a single character dot matrix direct drive display.

Reference is made to FIG. 9, showing in more detail a direct drive dot matrix display 150 which utilizes a dual compartment arrangement somewhat similar in concept to the arrangement shown in FIG. 2. The dot matrix arrangement 150 in FIG. 9 represents a single character position which is comprised of thirty-five separate dot or electrode pads 152 which are arranged in a 5×7 rectangular matrix. The overall dot matrix display 150 is divided into a first compartment 154 containing the electrode pads 152 and a surrounding background compartment 156. The entire display is enclosed by a sealed perimeter 158. The first compartment 154 and the background compartment 156 are separated by a barrier seal 155.

The electrode compartment fill port 160 is designed to allow entrance of the liquid crystal display medium into the electrode compartment 154. The background compartment fill port 162 is for the entrance of the background material to be placed in the background compartment 156. Also located within the electrode compartment 154 are a series of channelizing seal lines 164 which create a seal between the opposing plates of the display and form a series of 7 horizontal channels 165 with respect to FIG. 9. In each one of these channels are 5 electrode pads 152 which are separated by a specified distance to establish a gap 166 of approximately fifteen to twenty thousandths of an inch between them. In addition to providing a channelized arrangement around the various horizontal rows of electrodes 152, the channelizing seal lines 164 provide an additional function as will be explained.

The display in FIG. 9 has a base plate 167 and a face plate 169. The electrode pads 152 as well as at least a portion of the perimeter seal 158 and the channelizing seal lines 164 are positioned on the base plate 167. However, depending upon the particular display these electrode pads, perimeter seal and seal lines could be on the face plate 169. The face plate with respect to the base plate having the display layout shown in FIG. 9 can have a continuous film opposing electrode. There is no requirement that the opposing electrode have a particular electrode pattern. The material that is placed within the background compartment area 156 is a nematic liquid crystal dichroic dye material which will be in the quiescent state and have a specific residual color depending upon the absorption characteristics of the dye material in the liquid crystal composition. Therefore, even if opposing electrode lines in the background area are activated, they will not affect the characteristics of the dye material in the background. A cholesteric liquid crystal dichroic dye material is placed in the electrode compartment 154. The cholesteric liquid crystal dichroic dye material will appear darker in the electrode compartment 154 than the nematic material that is in the background compartment 156. This is because the cholesteric liquid crystal material is turned and there is more light absorption of the dye material.

However, when it is desirable to have a particular pattern shown on the dot matrix arrangement of the electrodes 152, it is necessary to turn on the electrode dots 152 which are not to be viewed. Consequently, if all of the electrode pads 152 in the vertical column closest to the fill port 160 with respect to FIG. 9 are to be visible, it would be necessary to activate the remaining twenty-eight electrode pads so that they would blend in with the background material 156. This is because when the cholesteric liquid crystal dichroic dye material is activated, it will take on the characteristics of the nematic liquid crystal material in the background compartment 156.

As with respect to the device shown in FIG. 2, it is assumed that the barrier seal 155 which divides the electrode compartment 154 from the background compartment 156 can be colored or dyed of a compatible color that is in the background compartment 156, so that it will not be discernible when viewing the display at its intended distance of use. Similarly, the channelizing lines 164 can be made of a material colored or dyed to a compatible color so they will not be noticeable when viewing the display.

Attention is directed to FIG. 10, showing an enlarged junction point between one of the channelizing lines 164 and the barrier seal 155. The channelizing lines 164 provide a cover or mask over the very thin electrode connecting lead lines 172 which are directed to the various electrode pads 152 in each horizontal row that is divided by the channelizing lines 164. These electrode lead lines 172 are made by photolithography and, therefore, are extremely narrow being approximately two mils and extend horizontally to connect with each of the electrode pads 152 adjacent that particular channelizing line.

The display 150 in FIG. 9 is designed for direct addressing of each electrode pad 152, so that an electrode lead line must be connected directly to each individual electrode pad 152. The thicker portions 174 of the electrode lines 172 which extend beyond the barrier seal line 155 are directed either to a first edge 176 of the display in FIG. 9 or the opposite edge 178 of the display to connect with termination pads 180 on each of the projecting edges of the larger base plate 167 of the display. As stated previously, since the liquid crystal material in the background area 156 in FIG. 9 is in the quiescent state, any activation between the opposing continuous electrode on the opposing face plate and the enlarged portions 174 of electrode lead lines will not cause any change in the characteristics of the background liquid crystal material.

The use of the channelizing lines across the dot matrix arrangement with respect to FIG. 9 provide the function of masking the very thin electrode lead lines 172 that are connected to each of the dot matrix electrode pads. Therefore, if sealing material can be placed within the display area without adversely affecting the aesthetic quality or operation of the display device, it can be very conveniently used as a masking technique for lead lines that are necessary for connecting to the display electrodes in the overall display device.

Although much discussion has been directed to the concept of a dual compartment display as shown in the embodiments of FIGS. 2–5, it is envisioned that the multi-compartment concept of the present invention could be directed to numerous compartments depending upon the particular areas of contrast desired.

What is claimed is:

1. A display device comprising:
    a pair of insulating plates in face-to-face relationship to form a sealed envelope with a visible display area;
    partitioning means on one of said plates for establishing a first compartment and a second compartment within said envelope;
    a plurality of electrodes within said first compartment of said envelope;
    a first liquid crystal dye composition within said first compartment, said composition assuming a first color when activated and a second color when unactivated;
    a second liquid crystal dye composition within said second compartment and having said first color of said first liquid crystal dye composition;
    a plurality of lead lines within said envelope, each of said lines connecting at least one of said electrodes to exterior electronics; and
    insulating means disposed over said lead lines for insulating said lead lines from said composition so that activation of said lead lines will not activate said composition within said display area adjacent said lead lines, said insulating means being dyed to match one of said first and second colors of said composition so that said insulating means is not discernible when viewing said display at a normal viewing distance.

2. A dot matrix display device comprising:
    a pair of plates sealed together in face-to-face relation to form a sealed envelope with a display area;
    partitioning means on one of said plates for establishing a first compartment and a second compartment in said envelope;
    a matrix of display electrodes in rows and columns within said first compartment of said envelope;
    a plurality of lead lines within said envelope, each of said display electrodes being connected to a lead line for electrical communication with exterior circuitry;
    a first liquid crystal dye composition within said first compartment, said composition having one color when activated and another color when not activated;
    a second liquid crystal dye composition within said second compartment and having a color substantially the same as said one color of said first liquid crystal dye composition, said second compartment adjacent relation to said first compartment; and
    a plurality of channelizing seal lines projecting into said display area between said electrodes to divide said electrodes into one of a series of columns and a series of rows, said lead lines extending between said electrodes to connect directly to each electrode, said channelizing lines insulating said lead lines from said composition so that activation of said lead lines will not activate said composition adjacent said lead lines, said channelizing lines being dyed to match one of said one color and said another color of said first composition so that said channelizing lines will not be noticeable within said display area as said dot matrix is operated to provide a visible message.

3. An electro-optic display device for creating visual message symbols, said device comprising:
    a pair of insulating plates forming an interior envelope, said envelope being divided into at least two separate compartments, one of said compartments containing the area for said symbols, the other of said compartments being a background area in adjacent to said one compartment;
    partitioning means on one of said plates for establishing a first compartment and a second compartment within said envelope;
    a first liquid crystal medium located in said one of said compartments;
    a second liquid crystal medium located in said other of said compartments; and
    electrode means within said one of said compartments for changing the electro-optic character of said first liquid crystal medium to form a visible contrast between the portion of said first liquid crystal medium activated by said electrode and the remainder of said first liquid crystal medium not activated by said electrode, said second liquid crystal medium being optically equivalent to one of said portion and said remainder of said first liquid crystal medium so that the entire envelope has a uniform color appearance except for one of said portion and said remainder of said first liquid crystal medium.

4. An electro-optic display device as defined in claim 3, wherein said electrode means comprises:
    an electrode pattern on the interior surface of one of said plates; and
    a common electrode on the interior surface of the other of said plates opposing said electrode pattern.

5. An electro-optic display device as defined in claim 4, wherein said first electro-optic medium is a cholesteric liquid crystal dichroic dye material.

6. An electro-optic display device as defined in claim 4, wherein said second electro-optic medium is a liquid crystal dichroic dye material without cholesteric component.

7. An electro-optic display device as defined in claim 3, wherein said first electro-optic medium is a mixture of positive and negative dichroic dyes with complementary absorption characteristics to enchance visual color contrast of the display.

8. An electro-optic display device as defined in claim 3, wherein said compartments are formed by a thin ridge seal forming a wall between said plates.

9. An electro-optic display device as defined in claim 3, wherein each of said compartments has a separate fill port.

10. An electro-optic display device as defined in claim 3, wherein areas within said one of said compartments not occupied by said electrode means creating a permanent indicia not subject to change.

11. An electro-optic display device comprising:
    a pair of insulating plates sealed in parallel relation to each other to form an interior envelope;

partitioning means on one of said plates for establishing at least two separate compartments within said envelope, said compartments being in adjacent to each other;

a first liquid crystal light absorbing mixture within one of said first compartments;

a second liquid crystal light absorbing mixture within the other of said compartments; and electrode means within one of said compartments for changing the light absorbing characteristics of said first mixture so that said portion of said first mixture will be optically equivalent to said second mixture in the other of said compartments to provide one uniform color throughout said display except for the other portion of said first mixture not being changed in light absorbing characteristics by said electrode means.

12. An electro-optic display device comprising:

a base plate;

a substrate sealed in face-to-face relation with said base plate to form an interior envelope;

partitioning means on one of said plates for establishing a first compartment and a second compartment within said envelope;

a first compartment formed within said envelope;

a second compartment formed within said envelope;

an electrode pattern within said envelope adjacent one of said compartments;

a cholesteric liquid crystal dichroic dye material within said one of said compartments; and a nematic liquid crystal dichroic dye material within the other of said compartments, energization of any portion of said electrode pattern changing said cholesteric material adjacent to said portion of said electrode pattern to the nematic state to be optically equivalent to said nematic material in said other of said compartments.

13. An electro-optic analog display device comprising:

at least two plates joined together in parallel relation to each other to form an interior envelope;

a plurality of separate compartments formed within said envelope;

partitioning means on one of said plates for establishing a first compartment and a second compartment within said envelope;

one electrode means located in a first one of said compartments;

another electrode means located in a second one of said compartments, said first and second ones of said compartments forming separate analog display areas;

a first liquid crystal material in said first and second one of said compartments; and a second liquid crystal material in a third one of said compartments, said third one of said compartments being a background area of said display adjacent at least one of said first and second one of said compartments, activation of one of said one and another electrode means causing said first liquid crystal material to be the optical equivalent of said second liquid crystal material in said third compartment.

14. An electro-optic display device as defined in claim 13, wherein spaces between electrodes in said one and another electrode means form visible incremental measurement lines in said first and second one of said compartments.

* * * * *